United States Patent Office 3,144,485
Patented Aug. 11, 1964

3,144,485
α-(N-ARYL, ARALKYL) ACETAMIDOXIMES
Frederick Roger Benn, Philip Thomas Charlton, and Grace Lilian Mary Harmer, Nottingham, England, assignors to Boots Pure Drug Company Limited, Nottingham, England, a British company
No Drawing. Filed Jan. 17, 1961, Ser. No. 83,154
Claims priority, application Great Britain Jan. 20, 1960
7 Claims. (Cl. 260—564)

This invention relates to novel derivatives of hydroxylamine which have valuable antihistaminic properties.

The new derivatives of hydroxylamine are amidoximes with the general formula:

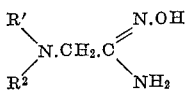

in which R' is an aralkyl radical, such as, benzyl, and $R^2$ is an aryl or p-substituted aryl radical, such as, phenyl, p-methyl phenyl, p-methoxy phenyl and p-chlorophenyl, and the said addition and hydrate salts thereof.

We have found that the compounds of the above general formula possess valuable properties as long acting antihistaminic drugs. Additionally they possess the great advantage that they do not act as depressants of the central nervous system and their use is unaccompanied by side effects such as lassitude, lack of concentration, muscular weakness, incoordination and dryness of the mouth.

The compounds of the present invention may be prepared by reacting hydroxylamine or a salt thereof with a compound of the general formula:

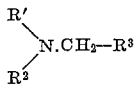

wherein R' and $R^2$ are as hereinbefore defined and $R^3$ represents

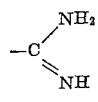

—$CS.NH_2$ —CN or the group

wherein $R^4$ represents lower alkyl and X represents oxygen or sulphur.

A particular method for the preparation of the compounds of the invention is by reacting hydroxylamine in alcoholic solution with the appropriate thioamide. Another valuable method of preparation is by reacting hydroxylamine with the appropriate nitrile. We have found that when hydroxylamine is reacted with the nitrile in the presence of sodium carbonate or bicarbonate particularly valuable results are obtained.

The compounds of the present invention may also be prepared by reacting a compound of the general formula:

where R' is as hereinbefore defined and Y represents Cl, Br or I, with an acid addition salt of an amidoxime of the general formula:

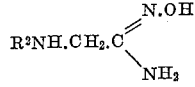

where $R^2$ is as hereinbefore defined.

The development of colour in the product is conveniently avoided by carrying out the reactions in an inert atmosphere, for example, nitrogen.

The product of the reaction may be isolated conveniently as the free base, as an acid addition salt or as a hydrate of the acid addition salt of the base and converted to the desired compound.

The compounds according to the present invention may be administered orally, by injection or topically and may be associated with other active ingredients if so desired.

Compositions suitable for oral administration include tablets, capsules and elixirs in which the active compound is associated with conventional diluents compatible with the active compounds. The tablets according to the invention may comprise the active compound as free base or a salt thereof in association with a diluent such as maize starch or lactose. In general the common acid addition salts of the free bases possess a bitter taste as do many other antihistaminic drugs and it may be desirable to enclose the active ingredient of the tablet in a palatable coating, for example a sugar coating. The free bases of the active compounds do not possess such an intense bitter taste and palatability problems may be overcome by employing the free base as the active ingredient of tablets. Elixirs according to the invention comprise the active ingredient in association with an aqueous diluent containing varying proportions of other ingredients such as glycerol or sucrose to which may be added colouring agents, flavouring agents and the like.

Clinical trials of α-(N-benzyl-N-phenylamino)-acetamidoxime in human patients have shown that it is effective in controlling allergic rhinitis, urticaria, angioneurotic oedema and pruritus in doses of between 75 and 1000 mg. per day per adult patient. The drug was administered in the form of oral tablets in divided doses of 25–250 mg. 3 or 4 times per day. The preferred dosage for general control of allergic reactions is 100–150 mg. 3 or 4 times per day. The drug was remarkably free from side effects and caused no drowsiness in a series of over 150 patients taking therapeutic doses of the drug. Furthermore, no atropine-like activity such as dryness of the mouth was experienced.

Compositions according to the invention adapted for injection comprise a sterile aqueous solution of the active ingredient to which may be added compatible bacteriostats and isotonic agents. It may also be found desirable to incorporate agents to improve the stability of the compositions, for example buffering agents and antioxidants.

Compositions adapted for topical use include creams, ointments, nasal sprays and lotions comprising the active compounds of the invention in association with pharmaceutically acceptable diluents. Cream and ointment formulations may be of the aqueous base or the fatty base type. We have found that a cream containing an active compound of the present invention in association with calamine gives very valuable results.

Nasal drops and sprays according to the invention comprise an aqueous solution of the active ingredient to which may be added conventional thickening agents and bacteriostats. We have found that a nasal decongestant preparation comprising other active agents such as naphazoline and phenylephrine in association with an active compound of the present invention is particularly valuable for the relief of symptoms of hay fever, allergic rhinitis and the like.

The invention is illustrated by the following non-limitative examples.

Example 1

A mixture of N-benzyl-N-phenylaminoacetonitrile (111 g.) anhydrous pyridine (400 cc.) and triethylamine (101 g.) was cooled in water and stirred while hydrogen sulphide gas was passed in. After 3 hours when 27 g. of hydrogen sulphide had been absorbed, the solution was allowed to stand at room temperature for one hour and was then poured into water (2 l.). The separated thioamide was collected by filtration, washed with water and sucked as dry as possible at the pump. The moist cake was refluxed for 2 hours in 95% ethanol with hydroxylamine hydrochloride (35 g.) and anhydrous sodium carbonate. The solution was allowed to stand for 2 hours at room temperature and the unchanged thioamide was filtered off. The filtrate was evaporated in vacuo and the concentrate was poured into water (2 l.) containing 5 N hydrochloride acid (100 cc.) when an oil separated. The suspension was stirred and the insoluble material was filtered off. The filtrate was diluted with water (500 cc.), allowed to stand overnight and filtered again. The filtrate was made alkaline to Brilliant Yellow with 5 N sodium hydroxide solution and a solid separated from which the supernatant was decanted. The solid was pulverised in a mortar, washed with water and dried in vacuo. The crude amidoxime so obtained was powdered and suspended in water (300 cc.), stirred and 5 N hydrochloric acid (50 cc.) was added. The resultant solution was heated with a little charcoal, filtered and the filtrate was allowed to crystallise at 0° C. The crystals were filtered off and crystallised from a mixture of absolute alcohol and ether. There was thus obtained as a colourless crystalline solid $\alpha$-(N-benzyl-N-phenylamino)acetamidoxime hydrochloride, M.P. 164–165° C. (Found: N, 14.5. $C_{15}H_{18}ON_3Cl$ required N, 14.4%.)

*Example 2*

Sodium methoxide (25% w./w. 1.4 kg.) was added with stirring to a solution of hydroxylamine hydrochloride (0.6 kg.) in methanol (6 l.). The sodium chloride which precipitated was filtered off, N-benzyl-N-phenylaminoacetonitrile (0.9 kg.) was added to the filtrate and the solution was stirred for 4 hours. The mixture was concentrated under reduced pressure until crystallisation started and the crystallisation was completed at 0° C. The crystals were filtered off and air dried to give $\alpha$-(N-benzyl - N - phenylamino)acetamidoxime M.P. 107–108° C. $\alpha$-(N-benzyl-N-phenylamino)acetamidoxime (20 g.) was added to a stirred solution of concentrated hydrochloric acid (10 cc.) in water (40 cc.) at 70° C. The clear solution was cooled to 0° C. and the hydrochloride which crystallised was collected by filtration, washed with water, alcohol and ether and dried in vacuo. There was thus obtained $\alpha$-(N-benzyl-N-phenylamino)acetamidoxime hydrochloride with a melting point undepressed in admixture with that made by the method of Example 1.

*Example 3*

A mixture of hydroxylamine hydrochloride (1480 g.) and sodium bicarbonate (1780 g.) was added gradually with stirring to a mixture of water (3.5 l.) and 95% ethanol (1.5 l.). The mixture was refluxed and allowed to cool to 50° C. N-benzyl-N-phenylaminoacetonitrile (2220 g.) was dissolved in 95% ethanol (2 l.) and the solution was added in a fine stream to the stirred hydroxylamine solution. The mixture was heated on the steam bath with stirring overnight, allowed to cool, and the solid which separated was collected by filtration. The solid was washed with aqueous ethanol, water and finally ether. The solid was dried in vacuo to give $\alpha$-(N-benzyl-N-phenylamino)acetamidoxime, M.P. 107–108° C., identical with that prepared in Example 2.

*Example 4*

A mixture of $\alpha$-(N-benzyl-N-p-chlorophenylamino)-acetamidine (1.6 g.) and hydroxylamine hydrochloride (0.42 g.) was refluxed in ethanol (5 cc.) for 1 hour. The cooled mixture was poured into water (50 cc.) and the white solid which separated was collected and crystallised from ethanol to give $\alpha$-(N-benzyl-N-p-chlorophenylamino)acetamidoxime M.P. 118–120° C. (Found: C, 62.6; H, 5.8; $C_{15}H_{16}ClN_3O$ requires C, 62.2; H, 5.5%.) To a suspension of the above amidoxime (0.5 g.) in ethanol (1 cc.) was added concentrated hydrochloric acid (0.16 cc.) to give a clear solution. Ether (20 cc.) was added and after standing for 10 minutes white crystals settled out. The crystals were filtered off, washed with ether and dried to give $\alpha$-(N-benzyl-N-p-chlorophenylamino)acetamidoxime monohydrochloride M.P. 157–159° C. (Found: C, 55.4; H, 5.3; $C_{15}H_{17}Cl_2N_3O_2$ requires C, 55.2; H, 5.2%.)

*Example 5*

The following nitriles were prepared by the method described in British Patent No. 699,644:

N-benzyl-N-p-tolylaminoacetonitrile B.P. 149–156° C./0.2 mm.
(Found: C, 79.3; H, 6.5; N, 11.4. $C_{16}H_{16}N_2$ requires C, 81.4; H, 6.8; N, 11.9%)
N-benzyl-N-p-methoxyphenylaminoacetonitrile B.P. 180–185° C./1 mm.
(Found: C, 77.5; H, 6.6; N, 10.15. $C_{16}H_{16}N_2O$ requires C, 76.2; H, 6.3; N, 11.1%).

From the above corresponding nitriles, the following amidoximes were prepared by the method described in Example 1.

$\alpha$-(N-benzyl-N-p-tolylamino)acetamidoxime M.P. 161–162° C. (dec.)
(Found: N, 10.4; $C_{16}H_{18}N_2S$ requires N, 10.4%)
$\alpha$ - (N - benzyl-N-p-methoxyphenylamino)acetamidoxime dihydrochloride M.P. 161–162° C. (dec.)
(Found: C, 53.7; H, 6.0; N, 11.6. $C_{16}H_{21}Cl_2N_3O_2$ requires C, 53.6; H, 5.9; N, 11.7).

*Example 6*

N-benzylanilinoacetimino ethyl ether hydrochloride (3 g.) dissolved in ethanol (30 cc.) was reacted with a solution of hydroxylamine from hydroxylamine hydrochloride (2.5 g.) and sodium (0.8 g.) in ethanol (25 cc.). The mixture was left to stand overnight, diluted with water and acidified with dilute hydrochloric acid. The insoluble oil which separated was extracted with ether and the aqueous solution was made just alkaline (pH 9) with dilute sodium hydroxide solution. $\alpha$-(N-benzyl-N-phenylamino)acetamidoxime precipitated from the solution, was collected by filtration, washed with water and crystallised from ethanol M.P. 108–110° C. The mixed melting point was undepressed in admixture with material made by the method described in Example 2. In a similar way but starting from N-benzylanilinoacetimino ethyl thioether, $\alpha$-(N-benzyl - N - phenylamino)acetamidoxime was prepared identical with authentic material.

*Example 7*

A mixture of $\alpha$-(N-benzyl-N-phenylamino)acetamidine (2.4 g.), hydroxylamine hydrochloride (0.69 g.) and ethanol (10 cc.) was refluxed for 1 hour, cooled and the ammonium chloride filtered off. The filtrate was allowed to crystallise, the crystals were collected and recrystallised from ethanol to give $\alpha$-(N-benzyl-N-phenylamino)acetamidoxime M.P. 107–109° C. which was undepressed in admixture with the pure compound made by the method described in Example 2.

*Example 8*

A mixture of anilinoacetamidoxime hydrochloride (2.01 g.), benzyl chloride (1.4 g.) and ethanol (10 cc.) was refluxed for 22 hours. The alcohol was distilled off, the residue was triturated with ether and, after decanting the ethereal supernatant the residue was dissolved in water (5 cc.).

The solution was left to crystallise, the crystals were collected and recrystallised from water to give $\alpha$-(N-benzyl - N - phenylamino)acetamidoxime hydrochloride M.P. 161–162° C. undepressed in admixture with the pure compound prepared as described in Example 2. In a similar way anilinoacetamidoxime was benzylated using the appropriate molar quantities of benzyl bromide or benzyl iodide.

Example 9

Sodium carbonate (106 g.) was added to a solution of N-benzyl-N-phenylaminoacetonitrile (222 g.) and hydroxylamine hydrochloride (148 g.) in ethanol at 70° C. The reaction mixture was allowed to stand for several hours and the product was isolated as described in Example 3 to give α-(N-benzyl-N-phenylamino)acetamidoxime identical with that made by the method described in Example 3.

Example 10

Sodium bicarbonate (890 g.) and hydroxylamine hydrochloride (740 g.) were added simultaneously to water (1.75 l.) and ethanol (0.75 l.) in a stirred flask, fitted with a reflux condenser. The solution was heated slowly to boiling, when carbon dioxide was evolved, and N-benzylanilinoacetonitrile (1110 g.) in ethanol (1 l.) was added over one hour. Heating was continued for 2 hours more, when the solid base started to separate. The mixture was cooled in ice/salt to complete the crystalisation, and the product was vaccum filtered. The residue was washed with 20% methanol (2.1), water (1 l.), and ether (1 l.). The pale cream base was dissolved in methanol (800 cc.) by heating to 50–60° C., and then placed in an ice bath. Concentrated hydrochloric acid (350 cc.) was added slowly as soon as crystallisation of the base started, the temperature being kept below 35° C.

Further cooling to approximately 0° C. gave a semi-solid mass, which was transferred to the vacuum filter and washed with 20% methanol (ca. 1 l.).

The white product was dried in vacuo at 45° C., to give α-(N-benzyl-N-phenylamino)acetamidoxime hydrochloride monohydrate.

(Found: Loss on drying, 6.0. $C_{15}H_{18}ClN_3O H_2O$ requires loss on drying 5.8%)

All operations were carried out in an atmosphere of nitrogen.

Example 11

A batch of tablets was prepared to give tablets of the following composition:

| | |
|---|---|
| α-(N-benzyl-N-phenylamino)acetamidoxime hydrochloride _____mg__ | 100 |
| Phenylephrine hydrochloride _____mg__ | 15 |
| Magnesium stearate _____percent__ | 0.5 |
| Starch, q.s. to a compression weight of 4½ grains (291.6 mg.). | |

Example 12

A cough mixture was prepared from the following ingredients:

| | |
|---|---|
| α - (N-benzyl-N-phenylamino)acetamidoxime hydrochloride _____mg__ | 10 |
| Phenylephrine hydrochloride _____mg__ | 5 |
| Glycerol _____percent w./v__ | 20 |
| Sodium citrate _____do____ | 1 |
| Syrup B.P. _____do____ | 40 |
| Flavour _____ | q.s. |
| Water, q.s. to 120 minims. | |

Example 13

A batch of tablets was prepared to give tablets of the following composition:

| | |
|---|---|
| α - (N-benzyl-N-phenylamino)acetamidoxime hydrochloride _____mg__ | 25 |
| Lactose _____ | |
| Icing sugar _____ q.s. to produce a 3 grain | |
| Starch _____ tablet. | |
| Magnesium stearate_____ | |

Using a similar tablet base 4½ grain tablets were prepared containing as active ingredient 100 mg. of the following compounds α-(N-benzyl-N-p-tolylamino)acetamidoxime hydrochloride, α-(N-benzyl-N-p-methoxyphenylamino)acetamidoxime hydrochloride.

Example 14

A nasal drop composition was prepared from the following ingredients:

| | Percent |
|---|---|
| α - (N-benzyl-N-phenylamino)acetamidoxime hydrochloride _____ | 0.5 |
| Phenylephrine hydrochloride _____ | 0.25 |
| Chlorbutol _____ | 0.5 |
| Glycerol _____ | 1.5 |
| Surfactant _____ | 0.02 |
| Thickener (synthetic type) _____ | 0.6 |
| Odorant _____ | 0.1 |
| Water to 100%. | |

A thick mucilage was prepared of the synthetic thickener with a little water and to it was added a solution of the chlorbutol, glycerol and odorant in 75 parts of water which had been filtered to give a bright filtrate. While stirring was continued an aqueous solution of the phenylephrine hydrochloride, α - (N-benzyl-N-phenylamino)acetamidoxime hydrochloride and the surface active agent was added, sufficient water was added to make 100 parts and stirring was continued until the nasal drop composition was homogeneous.

Example 15

A cough mixture was prepared from the following ingredients:

| | Parts |
|---|---|
| Sucrose _____ | 50 |
| Pholcodine tartrate _____ | 0.1 |
| α - (N-benzyl-N-phenylamino)acetamidoxime hydrochloride _____ | 0.5 |
| Menthol _____ | 0.02 |
| Citric acid _____ | 0.25 |
| 90% ethanol _____ | 1 |
| Oil of peppermint _____ | 0.002 |
| Oil of aniseed _____ | 0.002 |
| Water to 100 parts. | |

Example 16

A vanishing cream prepared from the following ingredients:

| | Percent |
|---|---|
| α - (N-benzyl-N-phenylamino)acetamidoxime hydrochloride _____ | 1 |
| Polawax (a proprietary emulsifying wax)_____ | 20 |
| Liquid paraffin_____ | 25 |
| Chlorocresol _____ | 0.2 |
| Water to 100%. | |

The emulsifying wax, chlorocresol and the liquid paraffin were heated together with stirring and a solution of the α-(N-benzyl-N-phenylamino)acetamidoxime hydrochloride was slowly added. Vigorous stirring was continued until the cream cooled and thickened.

Example 17

A calamine cream was prepared from the following ingredients:

| | Percent |
|---|---|
| Calamine _____ | 10.0 |
| α-(N-benzyl-N-phenylamino)acetamidoxime _____ | 0.5 |
| Emulsifying wax_____ | 1.25 |
| Liquid paraffin_____ | 4.0 |
| Chlorocresol _____ | 0.2 |
| Glycerol _____ | 2.5 |
| Synthetic type thickener_____ | 0.3 |
| Water to 100%. | |

An emulsion concentrate was prepared from the emulsifying wax, liquid paraffin and 40 parts of water and to it was added with stirring a concentrated mucilage prepared from the synthetic type thickening agent, the glycerol and 20 parts of water. Finally a mixture of the α - (N - benzyl-N-phenylamino)acetamidoxime base, calamine and perfume preparation, finely milled, was added and the mixture was stirred until a homogeneous cream was obtained.

*Example 18*

A batch of tablets was prepared to give tablets of the following composition:

| | |
|---|---|
| α - (N - benzyl - N - phenylamino)acetamidoxime hydrochloride | 100 mg. |
| Magnesium stearate | 0.5%. |
| Lactose | q.s. to a compression weight of 4½ grains (291.6 mg.). |
| Starch | |

We claim:
1. A compound selected from the group consisting of compounds of the formula:

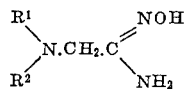

wherein R¹ represents benzyl and R² represents a radical selected from the group consisting of phenyl, p-methyl phenyl, p-methoxy phenyl and p-chloro phenyl, the acid addition salts thereof and the hydrated acid addition salts thereof.

2. α-(N-benzyl-N-phenylamino)acetamidoxime.
3. α - (N - benzyl-N-phenylamino)acetamidoxime hydrochloride.
4. α - (N - benzyl - N-phenylamino)acetamidoxime hydrochloride monohydrate.
5. α-(N-benzyl-N-p-tolylamino)acetamidoxime.
6. α - (N - benzyl - N - p - methoxyphenylamino) - acetamidoxime.
7. α - N - benzyl-N-p-chlorophenylamino)acetamidoxime.

References Cited in the file of this patent
UNITED STATES PATENTS

| | | |
|---|---|---|
| 2,156,254 | Manchey | Apr. 25, 1939 |
| 2,222,976 | Fox | Nov. 26, 1940 |
| 2,895,994 | Robinson | July 21, 1959 |
| 2,902,514 | Benneville | Sept. 1, 1959 |
| 2,947,782 | De Benneville et al. | Aug. 2, 1960 |
| 2,970,145 | De Benneville et al. | Jan. 31, 1961 |

OTHER REFERENCES

Hollander et al.: J. Org. Chem., vol. 23, pages 1112–1115 (1958).